(12) United States Patent
Zhao et al.

(10) Patent No.: US 12,507,864 B2
(45) Date of Patent: Dec. 30, 2025

(54) INTERACTIVE AUGMENTED REALITY SYSTEM FOR LAPAROSCOPIC AND VIDEO ASSISTED SURGERIES

(71) Applicant: Genesis Medtech (USA) Inc., Saint Louis Park, MN (US)

(72) Inventors: Bin Zhao, Ellicott City, MD (US); Ning Li, Pittsburgh, PA (US); Shan Wan, Plymouth, MN (US)

(73) Assignee: GENESIS MEDTECH INTERNATIONAL PRIVATE LIMITED, Singapore (SG)

( * ) Notice: Subject to any disclaimer, the term of this patent is extended or adjusted under 35 U.S.C. 154(b) by 156 days.

(21) Appl. No.: 17/982,970

(22) Filed: Nov. 8, 2022

(65) Prior Publication Data
US 2023/0147826 A1 May 11, 2023

Related U.S. Application Data

(60) Provisional application No. 63/277,511, filed on Nov. 9, 2021.

(51) Int. Cl.
*A61B 1/00* (2006.01)
*A61B 1/313* (2006.01)
(Continued)

(52) U.S. Cl.
CPC ........ *A61B 1/0005* (2013.01); *A61B 1/00009* (2013.01); *A61B 1/00055* (2013.01);
(Continued)

(58) Field of Classification Search
None
See application file for complete search history.

(56) References Cited

U.S. PATENT DOCUMENTS

| 9,547,940 B1 * | 1/2017 | Sun | G06T 7/344 |
| 10,951,837 B2 * | 3/2021 | Alzaga | H04N 13/128 |

(Continued)

OTHER PUBLICATIONS

International Application No. PCT/US22/49268, International Search Report and Written Opinion mailed Feb. 9, 2023, 13 pages.
(Continued)

*Primary Examiner* — Andrew G Yang
(74) *Attorney, Agent, or Firm* — MagStone Law, LLP; Enshan Hong (57) ABSTRACT

This disclosure describes an interactive augmented reality system for improving surgeon's view and context awareness during laparoscopic and video assisted surgeries. Instead of purely relying on computer vision algorithms for image registration between pre-operation (or intra-operation) images/models and later intra-operation scope images, the system can implement an interactive mechanism where surgeons may provide supervised information in initial calibration phase of the augmented reality function, thus achieving high accuracy in image registration. Besides the initialization phase before operation starts, interaction between surgeon and the system can also happens during the surgery. Specifically, patient tissue might move or deform during surgery, caused by for example cutting. The augmented reality system can re-calibrate during surgery when image registration accuracy deteriorates, by seeking additional supervised labeling from surgeons. The augmented reality system can improve surgeon's view during surgery, by utilizing surgeon's guidance sporadically to achieve high image registration accuracy.

18 Claims, 8 Drawing Sheets

(51) Int. Cl.
*G06T 7/00* (2017.01)
*G06T 7/33* (2017.01)
*G06T 19/00* (2011.01)
*G06T 19/20* (2011.01)
*A61B 1/04* (2006.01)
*A61B 90/00* (2016.01)

(52) U.S. Cl.
CPC ........ *A61B 1/00057* (2013.01); *A61B 1/3132* (2013.01); *G06T 7/0014* (2013.01); *G06T 7/337* (2017.01); *G06T 19/006* (2013.01); *G06T 19/20* (2013.01); *A61B 1/04* (2013.01); *A61B 2090/365* (2016.02); *G06T 2207/10068* (2013.01); *G06T 2207/30008* (2013.01); *G06T 2210/41* (2013.01); *G06T 2219/2004* (2013.01)

(56) References Cited

U.S. PATENT DOCUMENTS

| | | | | |
|---|---|---|---|---|
| 12,458,445 | B2* | 11/2025 | Storch | A61B 90/39 |
| 2008/0119725 | A1* | 5/2008 | Lloyd | A61B 90/36 |
| | | | | 600/424 |
| 2010/0290685 | A1* | 11/2010 | Wein | G06T 7/33 |
| | | | | 382/131 |
| 2011/0085716 | A1* | 4/2011 | Chefd'hotel | G06V 10/761 |
| | | | | 382/128 |
| 2017/0119473 | A1* | 5/2017 | Clopp | A61M 29/02 |
| 2018/0046875 | A1* | 2/2018 | Caluser | A61B 5/055 |
| 2018/0150929 | A1 | 5/2018 | Pheiffer et al. | |
| 2019/0088019 | A1 | 3/2019 | Prevrhal et al. | |
| 2019/0206134 | A1* | 7/2019 | Devam | G06F 3/011 |
| 2019/0231287 | A1* | 8/2019 | Krimsky | A61B 8/466 |
| 2019/0290247 | A1 | 9/2019 | Popovic et al. | |
| 2019/0333626 | A1 | 10/2019 | Mansi et al. | |
| 2020/0197107 | A1* | 6/2020 | Ryan | A61B 90/361 |
| 2021/0015560 | A1 | 1/2021 | Boddington et al. | |
| 2021/0055537 | A1* | 2/2021 | Komp | A61B 34/25 |
| 2021/0085220 | A1 | 3/2021 | Poltaretskyi et al. | |
| 2021/0244485 | A1* | 8/2021 | Coiseur | A61B 34/20 |
| 2021/0290038 | A1* | 9/2021 | Venkataraman | A61B 1/00045 |
| 2021/0307865 | A1 | 10/2021 | Shelton et al. | |
| 2022/0071716 | A1* | 3/2022 | Xu | A61B 34/35 |
| 2024/0285351 | A1* | 8/2024 | Stawiaski | G06T 7/37 |

OTHER PUBLICATIONS

Collins Toby et al: "A System for Augmented Reality Guided Laparoscopic Tumour Resection with Quantitative Ex-vivo User Evaluation", Feb. 22, 2017 (Feb. 22, 2017), SAT 2015 18th International Conference, Austin, TX, USA, Sep. 24-27, 2015; [Lecture Notes in Computer Science; Lect.Notes Computer], Springer, Berlin, Heidelberg, pp. 114-126, XP047405557, ISBN: 978-3-540-74549-5 [retrieved on Feb. 22, 2017].

* cited by examiner

INTERACTIVE AUGMENTED REALITY SYSTEM FOR LAPAROSCOPIC AND VIDEO ASSISTED SURGERIES

CROSS-REFERENCE TO RELATED APPLICATIONS

This application claims the benefit of priority to U.S. Provisional Application No. 63/277,511, filed Nov. 9, 2021, the entire disclosure of which is herein incorporated by reference in its entirety for all purposes.

FIELD

This disclosure relates to augmented reality systems for video assisted operations, and more particularly, to interactive augmented reality systems for laparoscopic surgeries. The video assisted operations may include robotic and non-robotic operations, including robotic laparoscopic surgeries and non-robotic laparoscopic surgeries. The video assisted operations include a wide variety and broad range of operations, and they are not limited to the examples specifically mentioned herein.

BACKGROUND

Figure 1:
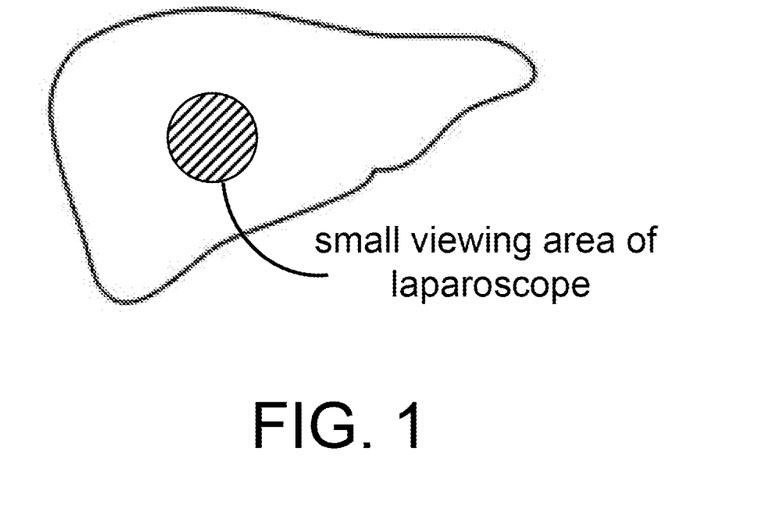
FIG. 1 illustrates the viewing angle of laparoscopic or other type of cameras in the example context of a liver.

One major challenge in laparoscopic surgeries or video assisted surgery is the limited viewing condition for surgeons, due to the small viewing angle of laparoscopic or other type of cameras, as illustrated in the example context of a liver in FIG. 1. Moreover, surgeons sometimes need to look at separate monitors with one displaying the real-time video feed from scopes and the other showing pre-surgery diagnostic imaging including CT (X-ray Computed Tomography), MRI (Magnetic Resonance Imaging), PET (Positron Emission Tomography) or sonography ("ultrasound"), which are often used for surgery planning and navigation to surgical site. The surgeon then has to mentally fuse such isolated pre-surgery imaging with the live laparoscopic view, causing additional mental load.

SUMMARY

This disclosure is directed to augmented reality systems for video assisted operations. The augmented reality systems may be interactive, and the video assisted operations may include laparoscopic surgeries including robotic laparoscopic surgeries and non-robotic laparoscopic surgeries. Some apparatus embodiments may include an apparatus comprising: a physical console configured for: receiving user-provided information that indicates a plurality of matching points between anatomical structures in reference images and corresponding anatomical structures in camera-captured images of a target field of view of a camera attached to a surgical instrument, wherein the camera-captured images are captured by the camera; performing image registration based on the received user-provided information that indicates the plurality of matching points between anatomical structures in reference images and corresponding anatomical structures in the camera-captured images; and overlaying, based on the image registration, augmented reality content on the camera-captured images; storage for recording the image registration, the storage included in the physical console or the storage separate from the physical console, wherein the camera-captured images overlaid with the augmented reality content are displayed on a display. In some apparatus embodiments, the physical console is configured for: checking accuracy of the image registration; and re-calibrating the image registration. In some apparatus embodiments, the physical console is configured for: generating an alert of a risk situation.

Some method embodiments may include a method comprising: capturing, by a camera, images of a target field of view of the camera, the camera attached to a surgical instrument; receiving user-provided information that indicates a plurality of matching points between anatomical structures in reference images and corresponding anatomical structures in the camera-captured images; performing image registration based on the received user-provided information that indicates the plurality of matching points between anatomical structures in reference images and corresponding anatomical structures in the camera-captured images; overlaying, based on the image registration, augmented reality content on the camera-captured images; and displaying the camera-captured images overlaid with the augmented reality content.

Some non-transitory machine-readable medium embodiments may include a non-transitory machine-readable medium storing instructions, which when executed by one or more processors, cause the one or more processors to perform a method, the method comprising: receiving user-provided information that indicates a plurality of matching points between anatomical structures in reference images and corresponding anatomical structures in camera-captured images of a target field of view of a camera attached to a surgical instrument, wherein the camera-captured images are captured by the camera; performing image registration based on the received user-provided information that indicates the plurality of matching points between anatomical structures in reference images and corresponding anatomical structures in the camera-captured images; and overlaying, based on the image registration, augmented reality content on the camera-captured images, wherein the camera-captured images overlaid with the augmented reality content are displayed on a display.

In some embodiments, the surgical instrument comprises a laparoscope. In some embodiments, the reference images are computed tomography (CT), magnetic resonance imaging (MRI), positron emission tomography (PET), or ultrasound images. In some embodiments, the augmented reality content is based on a 3D model, which is based on the reference images. In some embodiments, the augmented reality content includes visualized content that is hidden from the target field of view of the camera.

DETAILED DESCRIPTION OF PREFERRED EMBODIMENTS

This disclosure is not limited to the particular systems, devices and methods described, as these may vary. The terminology used in the description is for the purpose of describing the particular versions or embodiments only, and is not intended to limit the scope. Various examples will now be described. This description provides specific details for a thorough understanding and enabling description of these examples. One skilled in the relevant art will understand, however, various examples may be practiced without many of these details. Likewise, one skilled in the relevant art will also understand that embodiments can include many other obvious features not described in detail herein. Additionally, some well-known structures or functions may not be shown or described in detail herein, so as to avoid unnecessarily obscuring the relevant description.

Augmented reality (AR) can merge multiple information sources into a unified view generated by a computer, where multiple sources are aligned in real time. Besides fusing pre-surgery imaging or model to live surgery view, other important structures can be highlighted for easier localization where hidden anatomical structures (e.g., vessels or tumors below the organ surface) can be visualized as overlay to improve safety and avoid surgical errors and complications.

Such augmented reality system can be used in surgical navigation, where the exact position and size of the structures to be removed (e.g., tumor) is often not directly visible in the laparoscopic images. AR system providing an accurate visualization of such hidden structure helps surgeons choose an optimal dissection plan that minimizes damage of healthy tissues. Besides fusing different imaging modalities, the AR system can also alert surgeons in risk situations either through a sound or pop-up on screen, for example, when an instrument comes too close to a risk structure.

This disclosure describes an interactive augmented reality system for improving surgeon's view and context awareness during laparoscopic and video assisted surgeries. Instead of purely relying on computer vision algorithms for image registration between pre-operation images/models and intra-operation scope images, the system implements an interactive mechanism where surgeons provide supervised information in initial calibration phase of the augmented reality function, thus achieving high accuracy in image registration. Besides the initialization phase before operation starts, interaction between surgeon and the system also happens during the surgery. Specifically, patient tissue might move or deform during surgery, caused by for example cutting. The augmented reality system can re-calibrate during surgery when image registration accuracy deteriorates, by seeking additional supervised labeling from surgeons.

The augmented reality system improves surgeon's view during surgery, by utilizing surgeon's guidance sporadically to achieve high image registration accuracy. Even with the small viewing angle of laparoscopic or other types of cameras, the AR system of this disclosure can augment the content that is visible to the surgeon. For example, if the camera is positioned in very close proximity to liver tissue, the surgeon can only see red tissue, without this AR system. But this AR system can reveal what is underneath that red liver tissue, so that more information is visible to the surgeon.

Figure 2:
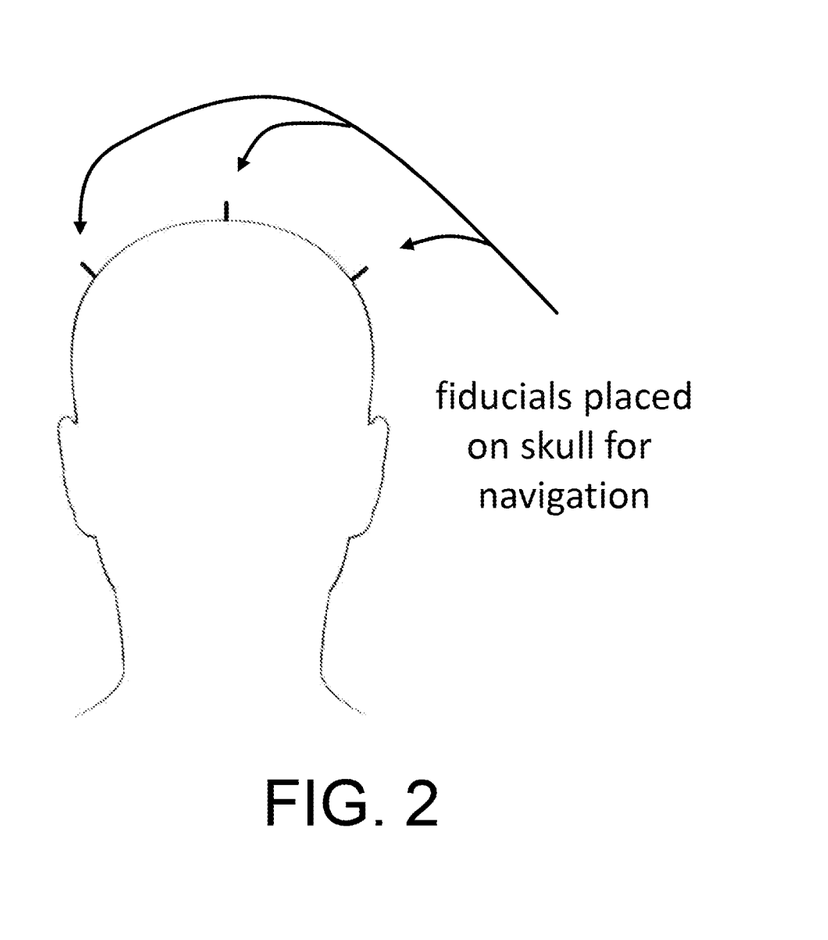
FIG. 2 illustrates fiducials placed on a human skull for navigation.

Surgical navigation through augmented reality has been widely adopted in neural and spinal surgeries, where a tracker can be placed on rigid structure, such as skull or bone. For example, FIG. 2 illustrates fiducials placed on a human skull for navigation. On the other hand, due to the frequent and irregular movement of tissues/organs in laparoscopic surgery, tissue deformation caused by surgeon's operation, and the difficulty of placing tracker on target tissue, augmented reality in laparoscopy for surgical navigation has not seen successful application. This disclosure goes beyond neural and spinal surgeries and describes an augmented reality system for laparoscopy, where it is difficult to place tracker on rigid structure.

The key technique in augmented reality for surgical navigation is image registration between pre-operation images/models and intra-operation images. This has traditionally been achieved through innovation in computer vision algorithms, without surgeon's participation. Due to the movement and deformation of tissues in laparoscopy, purely computer vision-based techniques have not been able to achieve high image registration accuracy. Also, the black box nature of these image registration models contributes to lack of trust from surgeons. To overcome these challenges, this disclosure describes an interactive mechanism where surgeons help algorithms in image registration by providing a few matching points between pre-operation and intra-operation images, as anchor points. The system then performs image registration using these anchor points to achieve high accuracy.

This disclosure describes an augmented reality system for improving surgeon's view and context awareness during laparoscopic and video assisted surgeries, by fusing pre-surgery (or intra-surgery) imaging and reconstructed model to live laparoscopic view, visualizing hidden anatomical structures as overlay on live images, and alerting surgeons of risk situations. The key module of such AR system is image registration, which aligns live laparoscopic video with pre-surgery (or intra-surgery) data, i.e., to fuse them to a common coordinate system. The main challenge in image registration in such AR system is the fact that the soft tissue is not rigid but shifting and deforming before and during surgeries. To tackle such challenge, this disclosure describes a human-in-the-loop interactive mechanism to shrink the search space of potential matching between multiple modalities of images, to increase the accuracy of image registration. Specifically, the system absorbs surgeon's labeling of key anatomical points during surgery, such as main artery location, and utilize such additional information to help match live laparoscopic images to pre-surgery (or intra-surgery) imaging.

Here, video assisted operations may include robotic and non-robotic operations, including robotic laparoscopic surgeries and non-robotic laparoscopic surgeries. The video assisted operations may include video assisted thoracoscopic surgery (VATS). The video assisted operations may include endoscopic, percutaneous, and colonoscopy procedures. The video assisted operations are not limited to the specific examples recited herein, but they include a wide variety and broad scope of operations.

Figure 3:
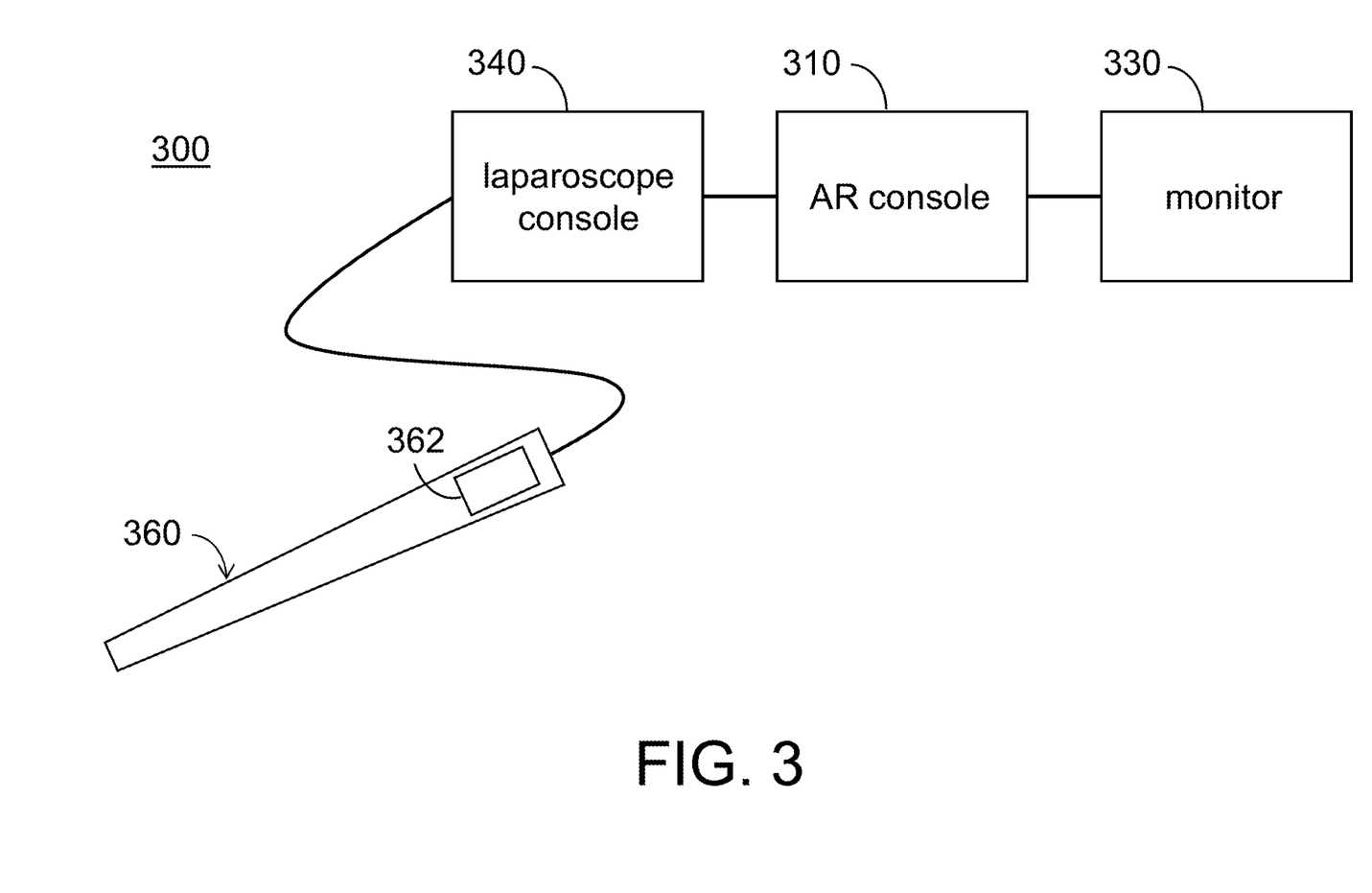
FIG. 3 illustrates an exemplary embodiment of the laparoscopy system with the AR system.

FIG. 3 illustrates an exemplary embodiment of the laparoscopy system 300 with the AR system. The AR system may be implemented in AR console 310 or in other form factors and implementations, including hardware or software or a combination of both hardware and software. AR console 310 can capture video image frames from laparoscope 360, e.g., by a video capture card. Camera 362 may be attached to, included inside as part of, or otherwise integrated with laparoscope 360. Camera 362 may comprise a video camera that captures images, which may be sent from laparoscope 360 to AR console 310. AR console 310 can store a pre-operation (or intra-operation) 3D model, which may be reconstructed from CT, MRI, PET, or ultrasound imaging, e.g., by a hard drive or other storage media. AR console 310 may run AR software to align the pre-operation (or intra-operation) 3D model to intra-operation video image frames from laparoscope 360, e.g., by the AR software using computer vision algorithms to perform the alignment. AR monitor 330 can visualize the augmented reality result, e.g., an augmented video where a deformed pre-op (or intra-op) 3D model is overlaid on a laparoscope video. AR monitor 330 may be a basic monitor that displays an augmented video received from AR console 310, or a more robust monitor system including circuitry that can perform some or all functionalities of AR console 310 to generate the augmented video, in addition to display components that can display the augmented video. Also, a display may perform the functionalities of AR monitor 330, such as a panel display that is part of AR console 310 or a separate display that can communicatively connect with AR console 310, e.g., via a wired connection or a wireless connection. A user of the AR system, e.g., a surgeon or another surgery team member, can operate the laparoscope console 340 to adjust or monitor settings for the laparoscope 360. Surgeons or other surgery team members can further the surgical treatment based on the AR images, e.g., by using stapling or energy devices to cut, remove, and seal tissues and/or vessels.

Figure 4:
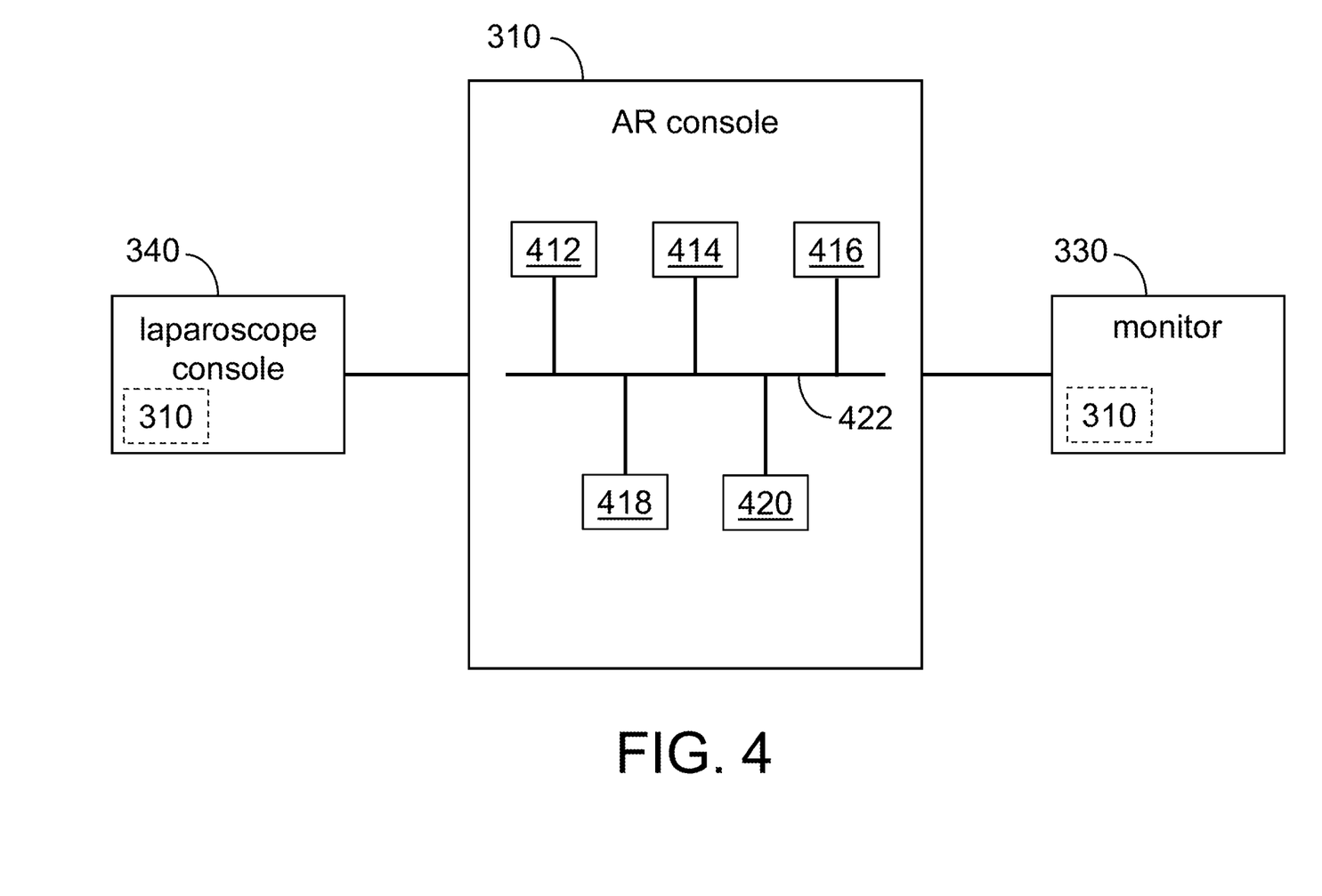
FIG. 4 illustrates an exemplary embodiment of the AR system implemented in an AR console.

FIG. 4 illustrates an exemplary embodiment of the AR system implemented in an AR console. AR console 310 may include circuitry 412, e.g., a video capture card, to capture video frames from laparoscope 360. AR console 310 may include storage 414, e.g., hard drive or other storage media, to store a pre-operation (or intra-operation) 3D model, CT, MRI, PET, or ultrasound images, and AR software. This storage may include one or more storage medium devices. AR console 310 may include circuitry 416, e.g., one or more CPUs or other kinds of processors, to execute software or firmware or other kinds of programs that cause circuitry of AR console 310 to perform the functions of AR 310. AR console 310 may include circuity 418, e.g., one or more GPUs, to perform real-time inference for AI models. AR console 310 may include or connect to user interface(s) 420 (e.g., manual operators like button(s), rotary dial(s), switch(es), touch surface(s), touchscreen(s), stylus, trackpad(s), mouse, scroll wheel(s), keyboard key(s), etc.; audio equipment like microphone(s), speaker(s), etc.; visual equipment like camera(s), light(s), photosensor(s), etc.; any other conventional user interface equipment) to receive inputs from and/or provide outputs to a user(s). Some or all of the components and/or circuitry of AR console 310 may be interconnected via one or more connections 422, like buses, cables, wires, traces, etc.

In some embodiments, AR console 310 may include programs like an operating system, e.g., Linux, to run operations of AR console 310. In some embodiments, AR console 310 may include circuitry, e.g., FPGA or ASIC, or some combination of hardware circuitry and software to run operations of AR console 310. Via some or all of the above components, AR console 310 can perform real-time video capture, image processing, and/or augmented reality visualizing. In some embodiments, instead of implementations of a separate AR console 310, the AR system can be implemented by hardware components, circuitry, and/or software in laparoscope console 340. In some embodiments, instead of implementations of a separate AR console 310, the AR system can be implemented by hardware components, circuitry and/or software in monitor 330. For example, monitor 330 may include element(s) of user interface 420, such as a touchscreen, microphone, speakers, and a camera, to receive user inputs and to provide system outputs to a user.

Figure 8:
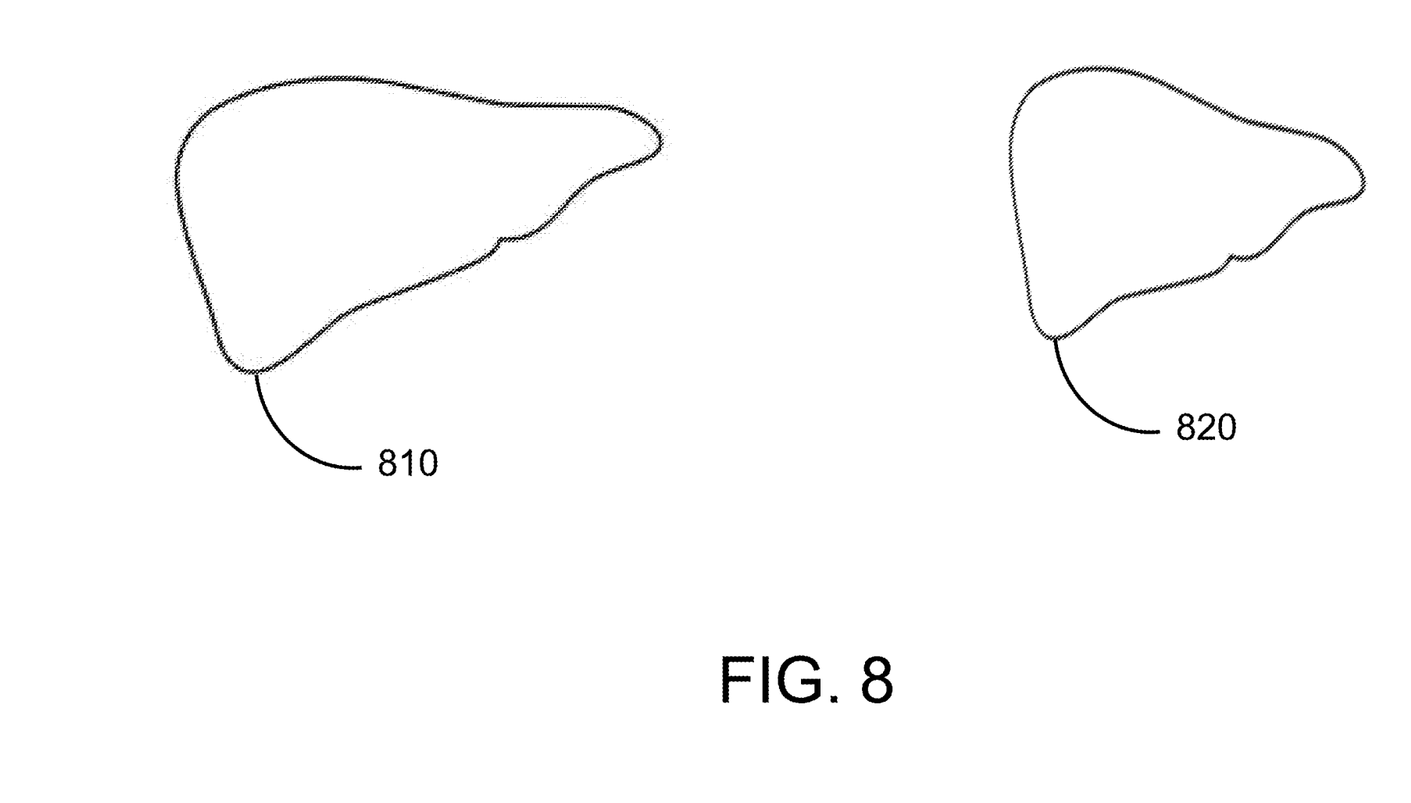
FIG. 8 illustrates a pre-surgery (or intra-surgery) 3D model deformed into a later intra-surgery 3D model.

The AR system has some or all of the following functions:

Fusion of pre-surgery (or intra-surgery) reconstructed 3D model with live laparoscopic images. 3D reconstruction is widely used as a surgery planning tool, where the 3D model of anatomical structure or tumor is built from volumetric images such as CT or MRI imaging, and such volumetric images may be stored in storage 414, which may be located inside or outside of AR console 310. The 3D model may also be built from PET or ultrasound imaging. The 3D model may also be reconstructed during surgery, i.e., an intra-surgery reconstructed 3D model. FIG. 8 illustrates a pre-surgery (or intra-surgery) version 810 of a 3D model reconstructed from CT or MRI imaging. The AR system will or can match such reconstructed 3D model with live laparoscopic images to visualize tumor as an overlay on the live laparoscopic images. In cases where the laparoscope's target field of view includes anatomical structure(s) or tumor(s) that is deforming (e.g., soft tissue/organs) during the laparoscopic surgery, that deforming shows up in intra-operation video frames from laparoscope 360. To match the deforming captured in the intra-operation video frames, AR console 310 can use an AI model that correspondingly deforms the pre-operation (or intra-operation) 3D model 810 into a later intra-operation 3D model 820, as illustrated in FIG. 8. Then AR console 310 can overlay the deformed 3D model 820 on video frames from laparoscope 360 to generate augmented video to output monitor 330. Monitor 330 can display the augmented video where AR information is aligned more closely with the deformed anatomical structure(s) or tumor(s), enhancing the surgeon's vision in the laparoscope's field of view.

Visualization of visible and hidden vessel, lymph nodes and nerve on live laparoscopic images. The system can detect and locate vessel, lymph nodes and nerve from pre-operation (or intra-operation) images, e.g., stored in storage 414, using neural network-based object detection and segmentation algorithm of computer vision algorithm(s) performed by, e.g., AR console 310. During the surgery, these pre-operation (or intra-operation) detected tissues will or can be fused with live laparoscopic images from laparoscope 360, through image registration performed by, e.g., AR console 310. The surgeons will then be able to see those otherwise hidden tissues from laparoscopic images through augmented reality in augmented video from, e.g., AR console 310, displayed on monitor 330. The system can also detect and locate vessel, lymph nodes and nerve from live laparoscopic images from laparoscope 360, using the same neural network-based object detection and segmentation algorithm of computer vision algorithm(s) performed by, e.g., AR console 310. In augmented video from, e.g., AR console 310, these visible tissues will or can also be highlighted on live laparoscopic images for better visualization on monitor 330.

Detection and localization of biomarkers used in the surgery. These biomarkers can be used for matching pre-operation (or intra-operation) and later intra-operation images. Biomarkers refer to any visible feature on organ tissue, such as vessel crossing points or an organ edge. The pre-operation (or intra-operation) and later intra-operation images can be stored in storage 414. The later intra-operation images may come from laparoscope 360 during surgery. AR console 310 can detect the presence of biomarkers and find the location of biomarkers in the images, e.g., via computer vision algorithm(s). Biomarkers may be useful as fiducial markers to AR console 310 and its computer vision algorithm(s) and/or to the surgeon, especially in cases where the laparoscope's target field of view includes a real-time, dynamically changing environment, such as anatomical structure(s) or tumor(s) that is deforming.

Figure 5:
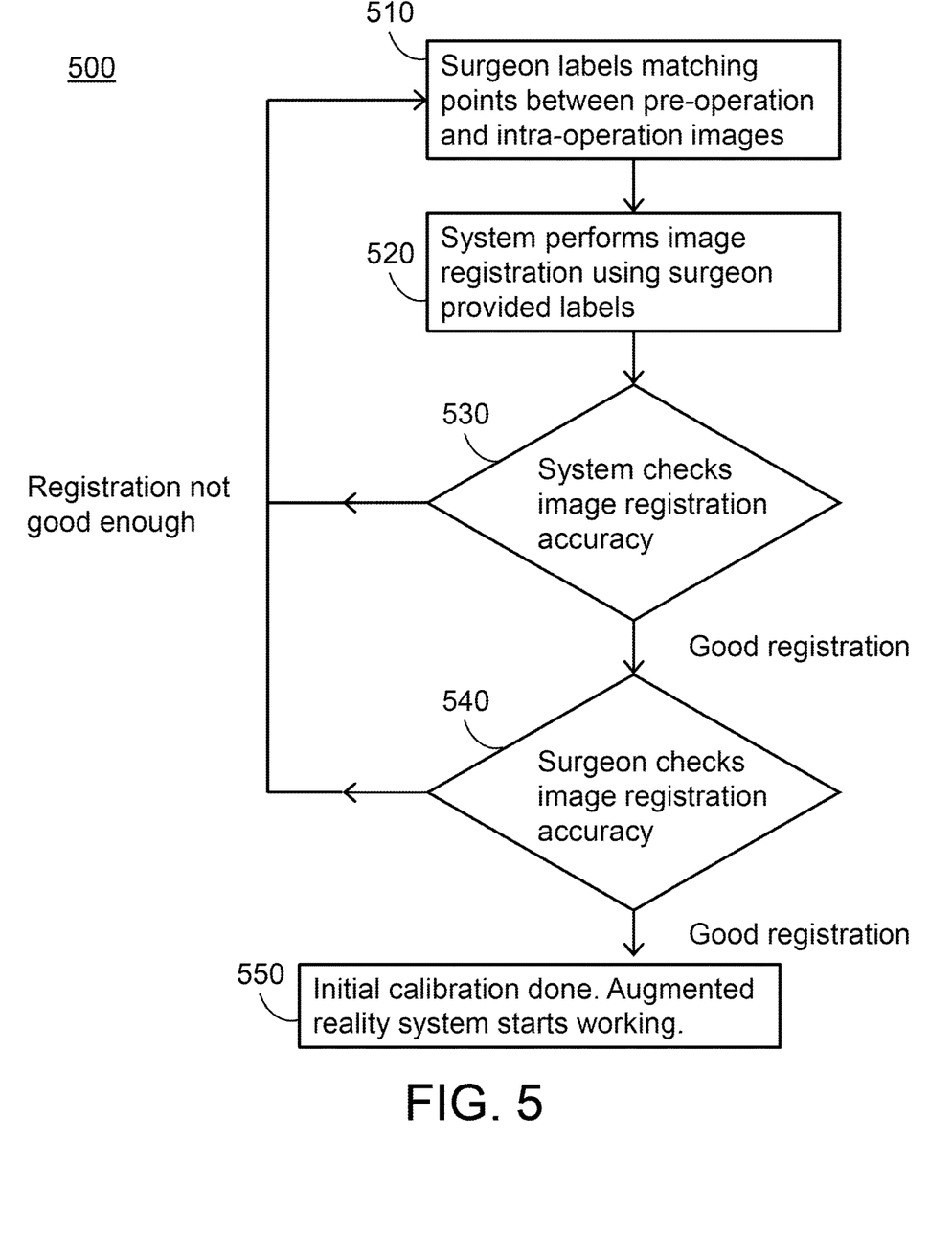
FIG. 5 illustrates interactive image registration for initial calibration and intra-surgery re-calibration of augmented reality system.

Interactive image registration between pre-operation (or intra-operation) images and later intra-operation images. FIG. 5 illustrates a flowchart 500 with details of the interactive mechanism, where surgeon's labeling in surgery is used for image registration. Besides such surgeon provided supervised information, visual appearance on tissues, such as vessel junctions and surface texture, as well as the biomarkers placed pre-surgery (or intra-surgery) and detected during surgery, will be used for the registration process.

Figure 6:
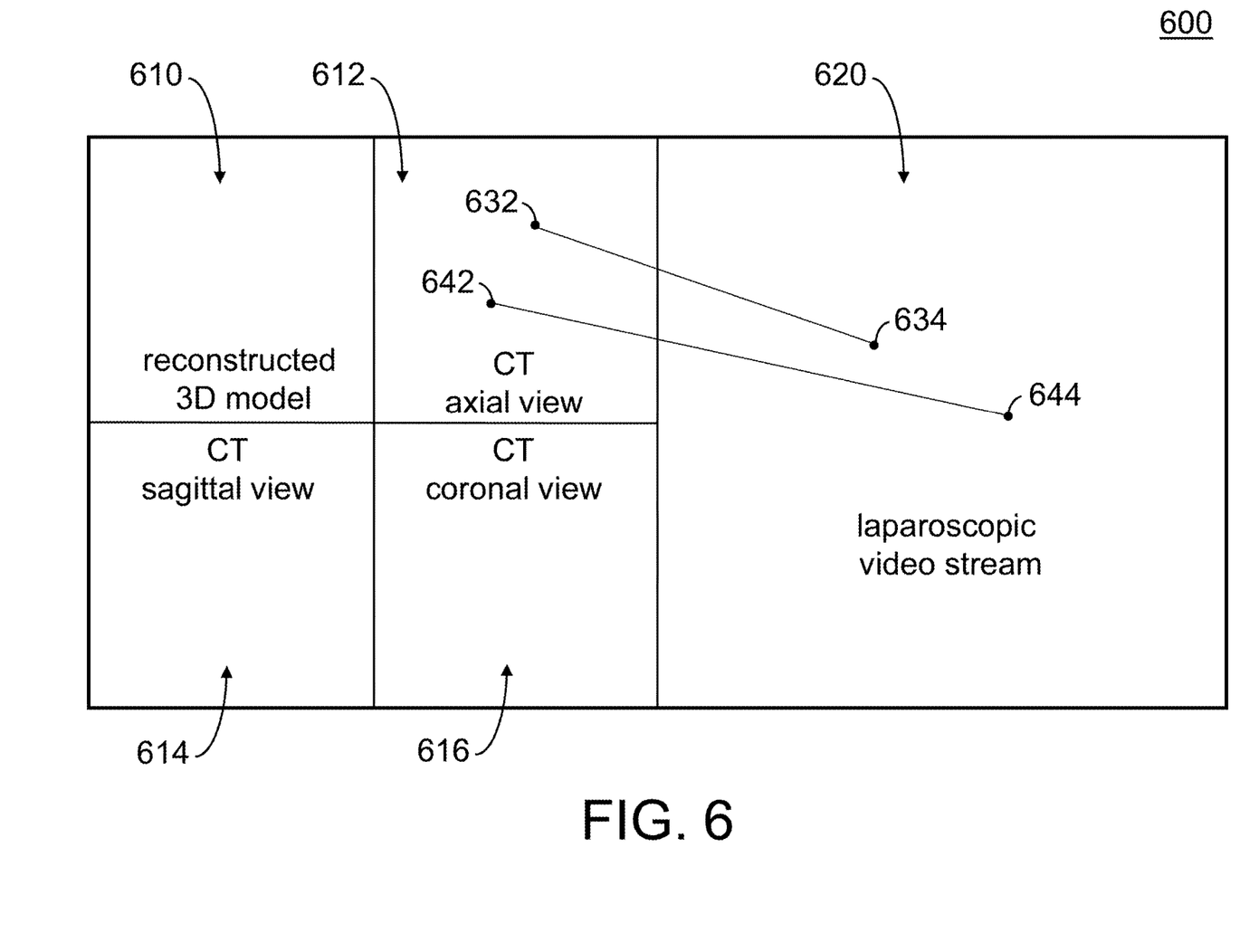
FIG. 6 illustrates a screen layout of AR software that a surgeon may use for labeling matching points or features between pre-operation imaging/model(s) and intra-operation imaging.

FIG. 6 illustrates a screen layout 600 of AR software, which may run on AR console 310, that a surgeon may use for labeling matching points. The screen layout may be displayed on monitor 330, or on a different display that is part of AR console 310, or on a different display that is separate from both AR console 310 and/or monitor 330. In the example screen layout 600, the left side may show CT, MRI, PET, ultrasound images and/or 3D model(s) 610 (e.g., in reconstructed 3D model), 612 (e.g., in CT axial view), 614 (e.g., in CT sagittal view), 616 (e.g., in CT coronal view) stored in storage 414, and the right side may show live laparoscopic images 620 from laparoscope 360. By being familiar both with content of the left-side images and/or models 610, 612, 614, 616 (e.g., pre-surgery or intra-surgery information) and the content of the right-side live laparoscopic video feed 620 in the target field of view of the laparoscope 360, a user surgeon has sufficient knowledge to be able to label matching points or features between the left-side (e.g., static and/or live dynamic) content and the right-side (e.g., live dynamic) content shown in screen layout 600.

By recognizing two pairs of matching points or features in left-side 612 and right-side 620, a user surgeon can label a first pair of matching points or features by setting a first left-side point 632 and a first right-side point 634 on the screen (e.g., by touching those two points on a touchscreen with a finger or stylus, by guiding a mouse pointer and clicking a mouse button when the pointer is at those two points, by pressing arrow keys to guide a pointer and then pressing a setting key (e.g., spacebar) when the pointer is at those two points, etc.). Then, a user surgeon can label a second pair by similarly setting a second left-side point 642 and a second right-side point 644 on the screen.

FIG. 5 can be further explained in view of the example of FIG. 6. In step 510, a user surgeon labels matching points between pre-operation (or intra-operation) and intra-operation images, as exemplified by the two pairs of matching points or features between left-side 612 and right-side 620 in FIG. 6 discussed above.

In step 520, the system performs image registration using surgeon provided labels, which may correspond to AR console 310 using the left-side points 632 and 642 (with any other surgeon-provided labeling input data) to label the right-side points 634 and 644 and then, based on that labeling, aligning the right-side live laparoscopic video images 620 with the left side image(s) and/or model(s) 610, 612, 614, and/or 616. The AR system may fuse the left-side (e.g., static and/or live dynamic) content 610, 612, 614, and/or 616 and the right-side (e.g., live dynamic) content 620 into a common coordinate system. Because the system uses inputs from a knowledgeable or informed user (e.g., surgeon, other surgery team member), users can facilitate algorithms in image registration, as those inputs can shrink the search space of potential matching features between multiple modalities of images, which can increase the accuracy and speed of image registration. When performing image registration, the AR system can use the matching points or features as anchor points, which can facilitate the achievement of increased speed and higher accuracy. As mentioned above, the system may perform image registration based not only on surgeon provided supervised information, but also further based on visual appearance on tissues, such as vessel junctions and surface texture, as well as the biomarkers placed pre-surgery and detected during surgery.

In step 530, the system checks image registration accuracy. If the image registration accuracy is not good enough, then the system returns to step 510 where the user surgeon can again label matching points between pre-operation and intra-operation images, as exemplified in FIG. 6. For example, there may have been an error(s) in previous steps 510 and/or 520 by the system or by the user surgeon, or the system may lack sufficient matching points from the user surgeon to reach a good level of image registration accuracy. On the other hand, if the image registration is good to the system, then the system can proceed to step 540.

In step 540, the surgeon check image registration accuracy. If the image registration accuracy is not good enough, then the system returns to step 510 where the user surgeon can again label matching points between pre-operation (or intra-operation) and later intra-operation images, as exemplified in FIG. 6. For example, the surgeon may desire a higher level of accuracy, or the surgeon may want to start over the entire calibration phase, or the surgeon may want to modify or cancel previously set label(s) or anchor point(s). On the other hand, if the image registration is good to the surgeon, then the system can proceed to step 550.

In step 550, the initial calibration phase of the system is done, and the augmented reality system may start working. For example, the AR system may perform some or all of its functions provide above, such as displaying augmented video on monitor 330 to enhance the surgeon's vision in the target field of view of laparoscope 360.

Figure 7:
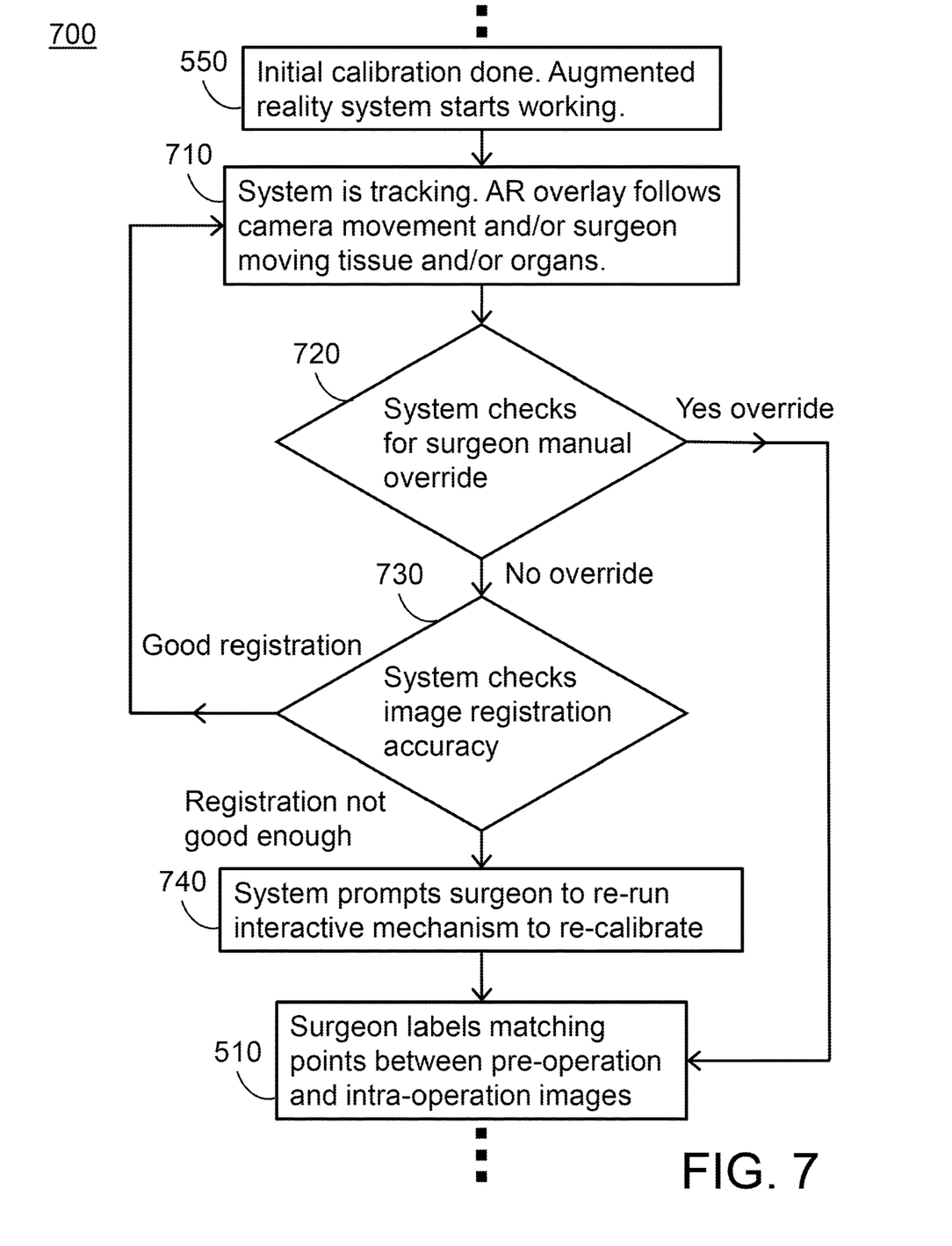
FIG. 7 illustrates a tracking phase after initial calibration.

The system's operational phase after the initial calibration may be understood in accordance with FIG. 7. FIG. 7 illustrates a flowchart 700 with details of the interactive mechanism, where tracking occurs after the initial registration of FIG. 5. During surgery, the surgeon can move the laparoscope 360 into various different positions and orientations. The AR system can track these scope movements such that the AR overlay follows the camera's movement and accommodates the corresponding changes in the laparoscope's target field of view. During surgery, the surgeon can also move tissue and organs while maintaining steady the position of laparoscope 360. The AR system can also track these movements and accommodate the corresponding changes in the laparoscope's target field of view.

In step 710, the system is tracking. In this tracking phase, the system's AR overlay follows camera movement and/or the surgeon moving tissue and/or organs. During surgery, the movement or deformation of tissue, caused by for example cutting, could deteriorate image registration accuracy. In step 730, the augmented reality system can check on image registration accuracy periodically or constantly, e.g., via computer vision algorithms, and when the image registration accuracy is at or above a pre-set threshold, then the system returns to or stays in step 710 of the tracking phase. When such accuracy is below pre-set threshold, then the system proceeds to step 740 where the system will or can prompt the surgeon to re-run the interactive mechanism, detailed in FIG. 5, to re-calibrate image registration and then proceed to step 510 of FIG. 5. In step 720, the surgeon could also manually override the system's decision and request re-calibration of image registration when they feel the accuracy is low, and then the system proceeds to step 510 of FIG. 5. Thus, even during surgery, the system can absorb surgeon's labeling of key anatomical points, such as main artery location, and can utilize such additional information to facilitate matching of points or features in live laparoscopic images to reference imaging, e.g., pre-surgery (or intra-surgery) imaging.

Surgeons can define risk structures which they should stay away from in the surgery, such as main vessel or nerve. Separate from the AR system, surgeons can define risk structures on pre-operation (or intra-operation) 3D models. The 3D models can be input into the AR system. With image registration locating hidden anatomical structures through fusion with pre-surgery (or intra-surgery) imaging, and automatic detecting and locating visible anatomical structures from live laparoscopic video, the AR system will or can alert surgeons during surgery if instrument (e.g., surgical instrument) comes too close to pre-defined risk structures, either through sound (e.g., from speaker(s) in AR console 310, in monitor 330, in laparoscope console 340, or located standalone) or pop-up on screen (e.g., of display on AR console 310, of monitor 330, on laparoscope console 340, or located standalone).

The AR system will or can be deployed in a console physically located in operating room and connected to laparoscopy system. The console can perform real time inference of the model. The console will or can also record image registration and detection results generated during the procedure and save such information to disk as system logs. In some embodiments, some or all components of the AR system can be remotely located outside the operating room and connected to a laparoscopy system via wired connections (e.g., data communication cable(s)) or wireless connections (e.g., Wi-Fi network or connection). In some embodiments, some or all components of the AR system can be physically integrated into the housing of a laparoscopy console. In some embodiments, some or all components of a laparoscopy system can be physically integrated into an AR console. In some embodiments, some or all components of the AR system can be physically integrated into the housing of a monitor. In some embodiments, some or all components of a monitor can be physically integrated into an AR console. In some embodiments, the AR system can be implemented as a software program or software module executed by one or more processors in a laparoscopy console or in a monitor. In some embodiments, the AR console can be connected to other consoles for other types of video-assisted surgeries, such as video-assisted thoracoscopic, endoscopic, percutaneous, colonoscopy surgeries, etc. Some or all of the disclosure relating to laparoscopes and laparoscopy may be similarly applied to other video-assisted surgical instruments and operations, such as endoscope and endoscopy, percutaneous scope(s) and surgery, colonoscope and colonoscopy, etc.

Figure 9:
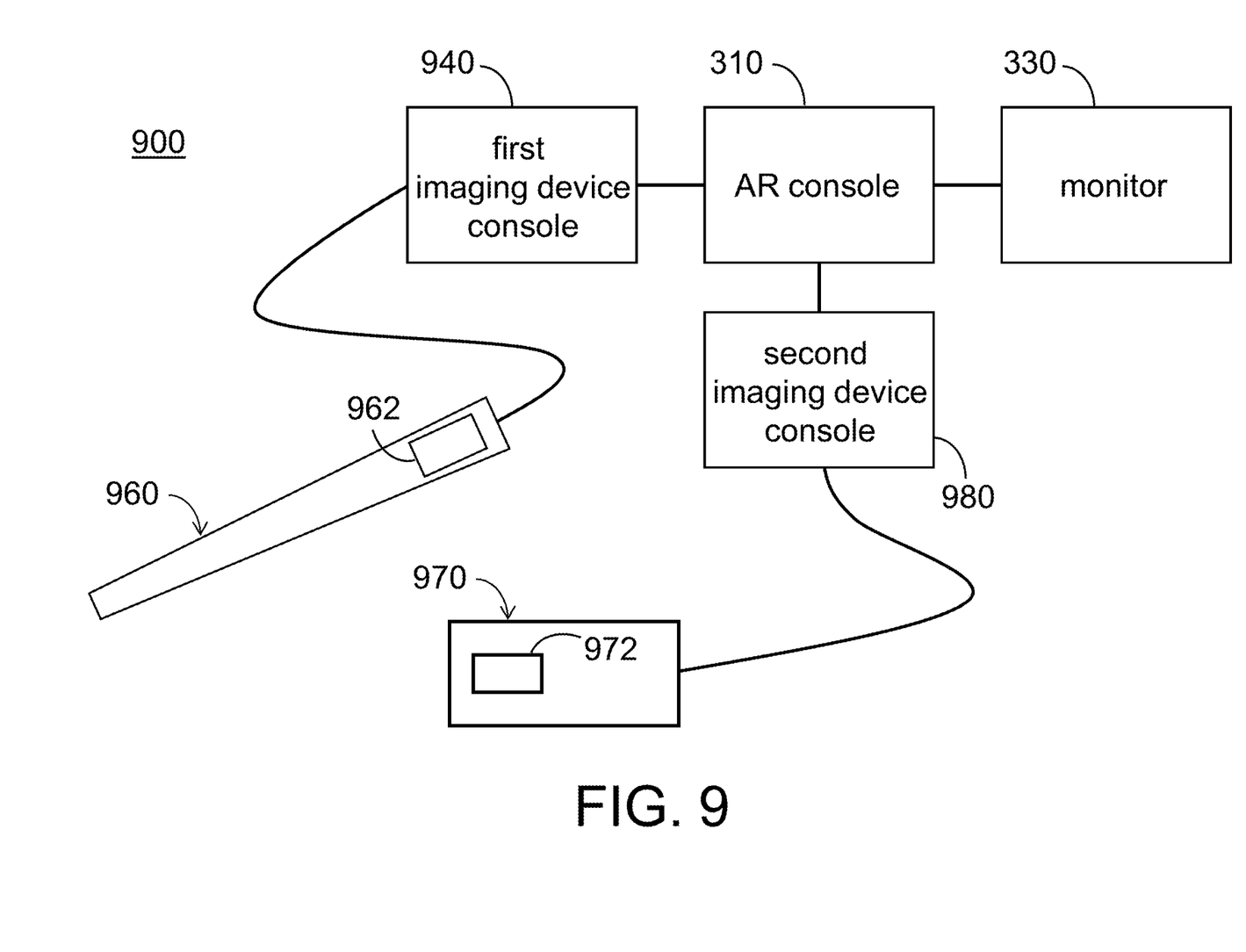
FIG. 9 illustrates an exemplary embodiment of a system with two imaging devices with the AR system.

FIG. 9 illustrates an exemplary embodiment of a system 900 with two imaging devices with the AR system. The AR system teachings above may be similarly applied here in AR console 310 in FIG. 9. AR console 310 can receive and/or capture images from first imaging device 960 and can receive and/or capture images from second imaging device 970, e.g., by one or more video capture cards, by receiving and storing in one or more storage media, etc. Scanner (e.g., camera, image generator) 962 may be attached to, included inside as part of, or otherwise integrated with first imaging device 962 (e.g., surgical scope, CT machine, MRI machine, ultrasound machine). Scanner 962 may capture or generate images, which may be sent from first imaging device 960 to AR console 310, e.g., as a first live image feed. Scanner (e.g., camera, image generator) 972 may be attached to, included inside as part of, or otherwise integrated with second imaging device 972 (e.g., surgical scope, CT machine, MRI machine, ultrasound machine). Scanner 972 may capture or generate images, which may be sent from second imaging device 970 to AR console 310, e.g., as a second live image feed. AR console 310 may fuse a first live image feed (e.g., real-time live endoscope image feed for bronchoscopy or colonoscopy) with a second live image feed (e.g., real-time live CT/ultrasound image feed). AR console 310 can store a pre-operation (or intra-operation) 3D model, e.g., by a hard drive or other storage media, and the 3D model may be reconstructed from CT, MRI, PET, or ultrasound imaging from the second imaging device 970. AR console 310 may run AR software to align the pre-operation (or intra-operation) 3D model to intra-operation images from the first imaging device 960, e.g., by the AR software using computer vision algorithms to perform the alignment. AR monitor 330 can visualize the augmented reality result, e.g., an augmented video where a deformed pre-op (or intra-op) 3D model is overlaid on the image feed from the first imaging device 960. AR monitor 330 can display an augmented video received from AR console 310, or generate and display the augmented video. Also, a display may perform the functionalities of AR monitor 330. A user of the AR system, e.g., a surgeon or another surgery team member, can operate the first imaging device console 940 to adjust or monitor settings for the first imaging device 960. A user of the AR system, e.g., a surgeon or another surgery team member, can operate the second imaging device console 980 to adjust or monitor settings for the second imaging device 970. In some embodiments, first imaging device 960 and first imaging console 940 may operate as a real-time 2D or 3D camera image feeding scope while second imaging device 970 and second imaging console 980 may operate to provide diagnostics imaging, such as driven by x-ray or ultrasonic imaging. Surgeons or other surgery team members can further the surgical treatment based on the AR images, e.g., by using stapling or energy devices to cut, remove, and seal tissues and/or vessels.

Exemplary embodiments are shown and described in the present disclosure. It is to be understood that the embodiments are capable of use in various other combinations and environments and are capable of changes or modifications within the scope of the concepts as expressed herein. Some such variations may include using programs stored on non-transitory computer-readable media to enable computers and/or computer systems to carry our part or all of the method variations discussed above. Such variations are not to be regarded as departure from the spirit and scope of the invention, and all such modifications as would be obvious to one skilled in the art are intended to be included within the scope of the following claims.

What is claimed is:

1. An apparatus comprising:
a physical console configured for:
receiving user-provided information that indicates a plurality of matching points between inner anatomical structures inside a body in reference images and corresponding inner anatomical structures inside the body in camera-captured images of a target field of view of a camera attached to a surgical instrument, wherein the camera-captured images are captured by the camera, wherein the matching points are determined after the reference images have been generated and after the camera-captured images have been captured by the camera;
performing image registration based on the received user-provided information that indicates the plurality of matching points between inner anatomical structures inside the body in reference images and corresponding inner anatomical structures inside the body in the camera-captured images;
overlaying, based on the image registration, augmented reality content on the camera-captured images, wherein the augmented reality content overlaid on the camera-captured images augments the view of the camera;
checking accuracy of the image registration based on the received user-provided information that indicates the plurality of matching points between inner anatomical structures inside the body in reference images and corresponding inner anatomical structures inside the body in the camera-captured images;
prompting a user to re-check the accuracy of the image registration; and
when the checked accuracy is below a pre-set threshold or when the user responds to the prompting by entering an input into the physical console indicating a redo, repeating the receiving step and the performing image registration step,
storage for recording the image registration, the storage included in the physical console or the storage separate from the physical console,
wherein the camera-captured images overlaid with the augmented reality content are displayed on a display, and
wherein the repeated receiving step and repeated performing image registration steps are based on a second instance of user-provided information that indicates a second plurality of matching points between inner anatomical structures inside the body in reference images and corresponding inner anatomical structures inside the body in camera-captures images of the camera attached to the surgical instrument.

2. The apparatus of claim 1, wherein the surgical instrument comprises a laparoscope.

3. The apparatus of claim 1, wherein the reference images are computed tomography (CT), magnetic resonance imaging (MRI), positron emission tomography (PET), or ultrasound images.

4. The apparatus of claim 1, wherein the augmented reality content is based on a 3D model, which is based on the reference images.

5. The apparatus of claim 1, wherein the augmented reality content includes visualized content that is hidden from the target field of view of the camera.

6. The apparatus of claim 1, wherein the physical console is configured for:
generating an alert of a risk situation.

7. A method comprising:
capturing, by a camera, images of a target field of view of the camera, the camera attached to a surgical instrument;
receiving user-provided information that indicates a plurality of matching points between inner anatomical structures inside a body in reference images and corresponding inner anatomical structures inside the body in the camera-captured images, wherein the matching points are determined after the reference images have been generated and after the camera-captured images have been captured by the camera;
performing image registration based on the received user-provided information that indicates the plurality of matching points between inner anatomical structures inside the body in reference images and corresponding inner anatomical structures inside the body in the camera-captured images;
overlaying, based on the image registration, augmented reality content on the camera-captured images, wherein the augmented reality content overlaid on the camera-captured images augments the view of the camera;
displaying the camera-captured images overlaid with the augmented reality content;
checking accuracy of the image registration based on the received user-provided information that indicates the plurality of matching points between inner anatomical structures inside the body in reference images and corresponding inner anatomical structures inside the body in the camera-captured images;
prompting a user to re-check the accuracy of the image registration; and
when the checked accuracy is below a pre-set threshold or when the user responds to the prompting by entering an input into the physical console indicating a redo, repeating the receiving step and the performing image registration step,
wherein the repeated receiving step and repeated performing image registration steps are based on a second instance of user-provided information that indicates a second plurality of matching points between inner anatomical structures inside the body in reference images and corresponding inner anatomical structures inside the body in camera-captures images of the camera attached to the surgical instrument.

8. The method of claim 7, wherein the surgical instrument comprises a laparoscope.

9. The method of claim 7, wherein the reference images are computed tomography (CT), magnetic resonance imaging (MRI), positron emission tomography (PET), or ultrasound images.

10. The method of claim 7, wherein the augmented reality content is based on a 3D model, which is based on the reference images.

11. The method of claim 7, wherein the augmented reality content includes visualized content that is hidden from the target field of view of the camera.

12. The method of claim 7, the method comprising:
generating an alert of a risk situation.

13. A non-transitory machine-readable medium storing instructions, which when executed by one or more processors, cause the one or more processors to perform a method, the method comprising:
receiving user-provided information that indicates a plurality of matching points between inner anatomical structures inside a body in reference images and corresponding inner anatomical structures inside the body in camera-captured images of a target field of view of a camera attached to a surgical instrument, wherein the camera-captured images are captured by the camera, wherein the matching points are determined after the reference images have been generated and after the camera-captured images have been captured by the camera;

performing image registration based on the received user-provided information that indicates the plurality of matching points between inner anatomical structures inside the body in reference images and corresponding inner anatomical structures inside the body in the camera-captured images;

overlaying, based on the image registration, augmented reality content on the camera-captured images, wherein the augmented reality content overlaid on the camera-captured images augments the view of the camera;

checking accuracy of the image registration based on the received user-provided information that indicates the plurality of matching points between inner anatomical structures inside the body in reference images and corresponding inner anatomical structures inside the body in the camera-captured images;

prompting a user to re-check the accuracy of the image registration; and when the checked accuracy is below a pre-set threshold or when the user responds to the prompting by entering an input into the physical console indicating a redo, repeating the receiving step and the performing image registration step, wherein the repeated receiving step and repeated performing image registration steps are based on a second instance of user-provided information that indicates a second plurality of matching points between inner anatomical structures inside the body in reference images and corresponding inner anatomical structures inside the body in camera-captures images of the camera attached to the surgical instrument, and wherein the camera-captured images overlaid with the augmented reality content are displayed on a display.

14. The non-transitory machine-readable medium of claim 13, wherein the reference images are computed tomography (CT), magnetic resonance imaging (MRI), positron emission tomography (PET), or ultrasound images.

15. The non-transitory machine-readable medium of claim 13, wherein the augmented reality content is based on a 3D model, which is based on the reference images.

16. The non-transitory machine-readable medium of claim 13, wherein the augmented reality content includes visualized content that is hidden from the target field of view of the camera.

17. The non-transitory machine-readable medium of claim 13, the method comprising:
generating an alert of a risk situation.

18. An apparatus comprising:
a physical console configured for:
receiving user-provided information that indicates a plurality of matching points between inner anatomical structures inside a body in reference images and corresponding inner anatomical structures inside the body in camera-captured images of a target field of view of a camera attached to a surgical instrument, wherein the camera-captured images are captured by the camera, wherein the matching points are determined after the reference images have been generated and after the camera-captured images have been captured by the camera;

performing image registration based on the received user-provided information that indicates the plurality of matching points between inner anatomical structures inside the body in reference images and corresponding inner anatomical structures inside the body in the camera-captured images;

overlaying, based on the image registration, augmented reality content on the camera-captured images, wherein the augmented reality content overlaid on the camera-captured images augments the view of the camera;

tracking movements of the surgical instrument with the attached camera;

tracking movements of inner anatomical structures inside the body;

overlaying, based on the tracked movements of the surgical instrument with the attached camera and based on the tracked movements of inner anatomical structures inside the body, the augmented reality content overlaid on the camera-captured images to follow movements of the camera and accommodate corresponding changes in the target field of view of the camera, and follow movements of inner anatomical structures inside the body and accommodate corresponding changes in the target field of view of the camera;

during one or more of the tracking steps, checking accuracy of the image registration based on the received user-provided information that indicates the plurality of matching points between inner anatomical structures inside the body in reference images and corresponding inner anatomical structures inside the body in the camera-captured images;

when a user enters an input into the physical console indicating a redo, repeating the receiving step and the performing image registration step, and storage for recording the image registration, the storage included in the physical console or the storage separate from the physical console, wherein the camera-captured images overlaid with the augmented reality content are displayed on a display, and wherein the repeated receiving step and repeated performing image registration steps are based on another instance of user-provided information that indicates another plurality of matching points between inner anatomical structures inside the body in reference images and corresponding inner anatomical structures inside the body in camera-captures images of the camera attached to the surgical instrument.

* * * * *